United States Patent
Feist et al.

(10) Patent No.: US 6,237,235 B1
(45) Date of Patent: May 29, 2001

(54) ELECTRONIC LEVEL AND PROCESS FOR VIDEO SIGHTING

(75) Inventors: Wieland Feist; Ludwin-Heinz Monz, both of Jena; Michael Kaschke, Oberkochen, all of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/350,857

(22) Filed: Jul. 9, 1999

(30) Foreign Application Priority Data

Jul. 29, 1998 (DE) .............................................. 198 33 996

(51) Int. Cl.$^7$ .................................................. G01C 15/02
(52) U.S. Cl. .................................................. 33/295; 33/290
(58) Field of Search ............................. 33/290, 291, 292, 33/293, 294, 295

(56) References Cited

U.S. PATENT DOCUMENTS

| | | | |
|---|---|---|---|
| 4,343,550 | * 8/1982 | Buckley et al. | 33/293 |
| 4,488,050 | * 12/1984 | Iwafune | 33/293 |
| 5,272,814 | * 12/1993 | Key | 33/290 |
| 5,402,223 | * 3/1995 | Schlobohm et al. | 33/294 |
| 5,551,159 | * 9/1996 | Mooty | 33/294 |
| 5,777,899 | * 7/1998 | Kumagai | 33/291 |
| 6,023,326 | * 2/2000 | Katayama et al. | 33/290 |
| 6,055,046 | * 4/2000 | Cain | 33/291 |
| 6,108,919 | * 8/2000 | Wu et al. | 33/292 |

* cited by examiner

*Primary Examiner*—G. Bradley Bennett
(74) *Attorney, Agent, or Firm*—Reed Smith LLP

(57) ABSTRACT

An electronic level comprising a clinometer, an image receiving device having a telescope with an objective and with a CCD receiver matrix and with a screen for displaying the image of a graduated staff which is set up at a target and provided with a coded graduation. A vertical axis is rotatable about the level. A leveling device is included for alignment and rough leveling of the level with respect to the graduated staff. An input unit is provided for entering measurement data. A power supply unit and a computer is included for processing the measurement data, calculating measurement values and for image evaluation. The image receiving device comprises a CCD receiver matrix which is preferably operated in video clock. The objective or the CCD receiver matrix is arranged in a fixed position relative to the vertical axis, and objective and CCD receiver matrix are adjustable relative to one another, and the clinometer is assigned in a fixed manner for measuring the deviation of the position of a sighting axis relative to the horizon, wherein the sighting axis is formed by a center pixel of the CCD receiver matrix.

8 Claims, 1 Drawing Sheet

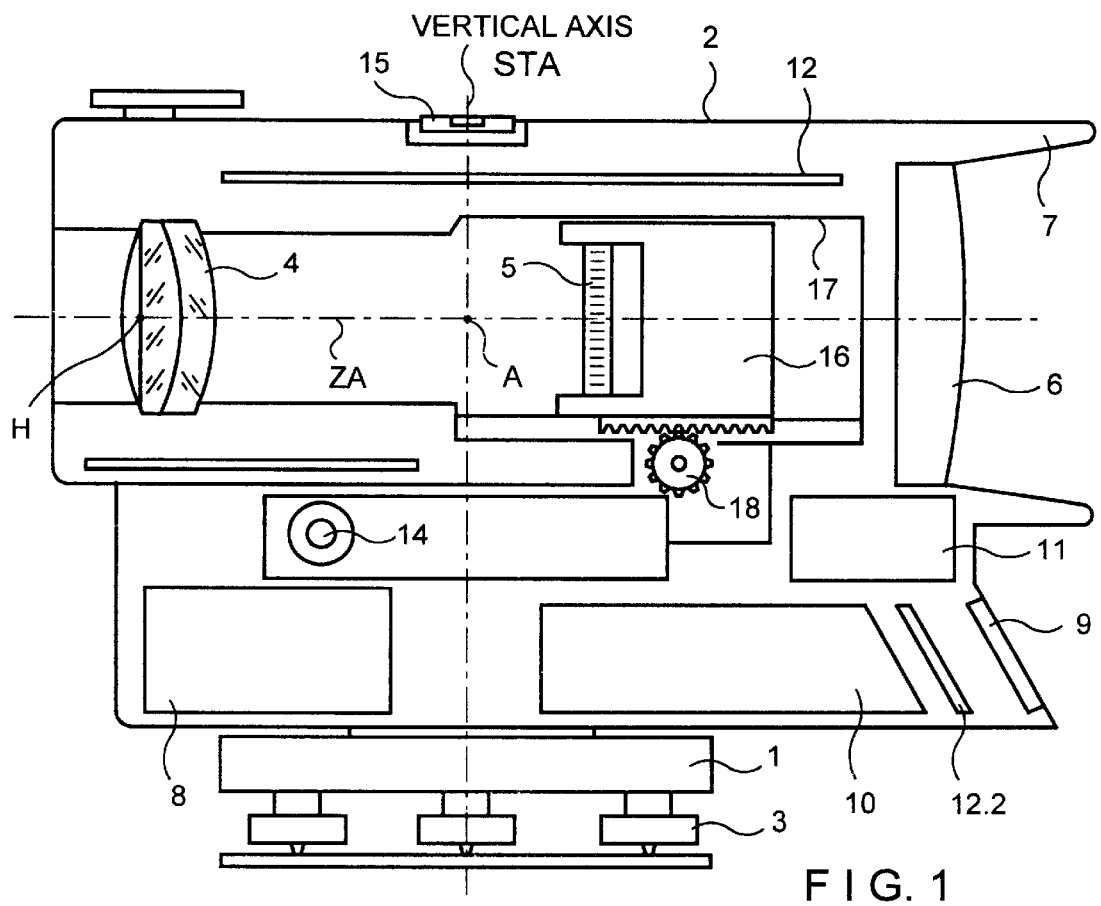
FIG. 1
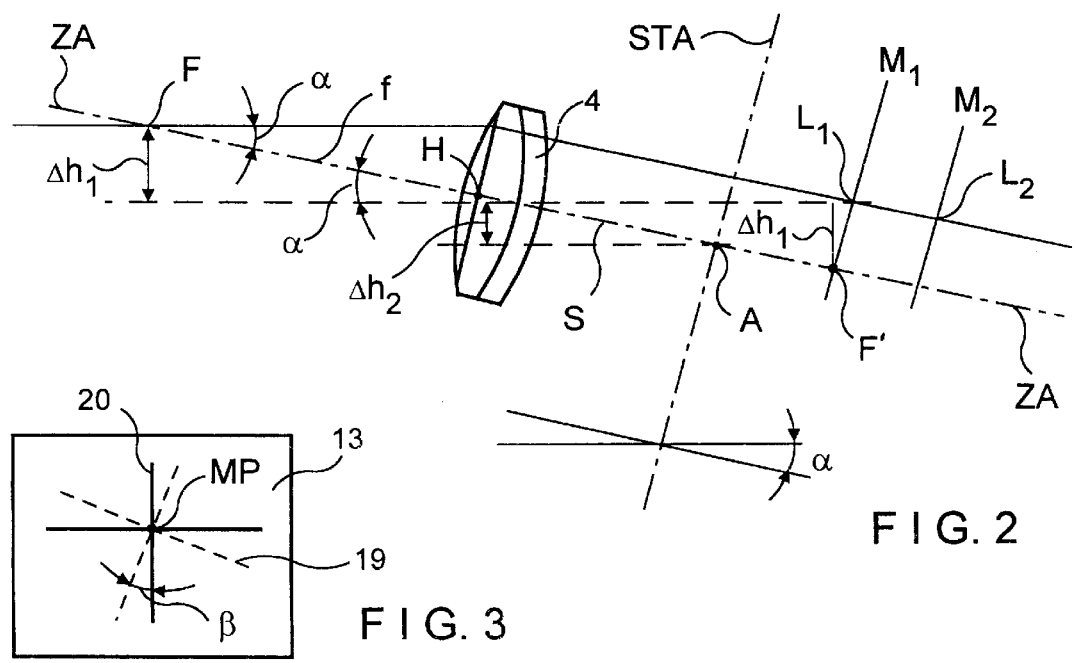
FIG. 2
FIG. 3

ELECTRONIC LEVEL AND PROCESS FOR VIDEO SIGHTING

BACKGROUND OF THE INVENTION a) Field of the Invention

The invention is directed to an electronic level with a clinometer and a process for video sighting or targeting of a graduated staff of at least one target at a distance, from the level in accordance with the preamble of the first patent claim, wherein the level, as a dumpy level or quickset level, has a high degree of automation at low manufacturing cost.

b) Description of the Related Art

DD 291 141 discloses an arrangement for leveling the line of sight of levels, wherein the arrangement comprises a telescope with a sighting axis, including an objective with sliding lens, a graticule and an eyepiece. The arrangement further contains a photoreceiver device with a differential photoelement and a piezo-actuator by means of which the graticule can be adjusted in such a way, depending on the signals which are supplied by a clinometer and appropriately processed by a microprocessor, that a leveling of the telescope axis is achieved.

JP 60-25 413 describes a level with a digital graduated staff at the target. In this case, a light beam is sent to the graduated staff via a beam splitter from a light source arranged in the level and an image of the graduated staff is received by an optical television camera system and displayed on a screen. The determined data are stored in a computer and evaluated in a suitable manner. The screen itself is a liquid crystal display with elements arranged in a matrix. The objective can be focused manually by a sliding lens.

Further, JP 5-272 970 discloses an automatic level which comprises a matrix receiver with a screen, wherein image signals from a CCD-camera are converted into corresponding digital signals by an analog-to-digital converter and are stored in a data storage. The CCD-camera has a focusable objective with a sliding lens.

In the above-mentioned arrangements, focusable objectives are always provided for sharp imaging of the staff graduation on a photoreceiver arrangement or CCD arrangement.

In order to do without focusing, a device for leveling purposes (DE 195 04 039 C1) was provided with imaging optics and a spatially-resolving optoelectronic detector for image recording. In this case, the imaging optics are divided into pupil zones imaging in different ways for different depth of focus ranges; different partial areas of the detector are allocated to the pupil zones. While this device does avoid focusing, the different imaging optics are relatively uneconomical.

In a process for geometric height measurement according to DE 39 16 385, in a manner analogous to the signals of a clinometer arranged in a measurement device independent from a telescope, the reference point for the horizontal position of the measurement device is provided on the center pixel of a CCD array and, when the device is tilted, is displaced in such a way that its position corresponding to the respective inclination of the device determines the intersection point of the horizontal sighting axis for a pixel or for the area between two pixels.

OBJECT AND SUMMARY OF THE INVENTION

It is the primary object of the invention to provide an electronic level and a process for video sighting of a graduated staff which ensures a high degree of automation of measurements at low manufacturing costs and while economizing on optical and mechanical structural component parts and in which large inclinations of the vertical axis can be compensated.

This object is met, according to the invention, in an electronic level which comprises a clinometer, an image receiving device having a telescope with an objective and with a CCD receiver matrix and with a screen for displaying the image of a graduated staff which is set up at a target and provided with a coded graduation, a vertical axis which is rotatable about the level, a leveling device for alignment and rough leveling of the level with respect to the graduated staff, an input unit for entering measurement data and a power supply unit and a computer for processing the measurement data, calculating measurement values and for image evaluation. The image receiving device comprises a CCD receiver matrix which is operated in video clock. The objective or the CCD receiver matrix is arranged in a fixed position relative to the vertical axis. The objective and CCD receiver matrix is adjustable relative to one another. The clinometer is assigned in a fixed manner for measuring the deviation of the position of a sighting axis relative to the horizon. The sighting axis is formed by a center pixel of the CCD receiver matrix.

The invention also encompasses a process for using the electronic level.

The level according to the invention is a camera level, as it is called, which basically includes only the objective, the clinometer, the vertical axis and an endless slow-motion tangent screw for sighting the graduated staff, a leveling device (tribrach or ball joint) and an image detection and image display system. The image detection system includes a CCD receiver matrix with the center pixel which, together with the object-side principle point of the objective, serves to determine the line of sight which is assigned in a fixed manner to the clinometer which measures, in a known manner, the deviation of the position from the horizontal. The CCD receiver matrix itself is operated in pixel clock or video clock and accordingly supplies moving images of the distant target to be measured.

In order that the position of a vertical axis inclined in space can also be taken into account in measurements with the level, the data supplied by the clinometer are included in the processing by the computer. Therefore, it is possible that the level need no longer be exactly leveled. In a case such as this, the graduated staff image would appear inclined on the screen. For this reason, the level is provided not only with image evaluating electronics and corresponding software, but also with a computer which calculates an appropriate height correction by means of the data supplied by the clinometer and applies this to the reading of the graduated staff. In this way, with the aid of the data from the clinometer which supplies data in two axes, a crosshair on the screen can be adjusted so as to be vertical and moved in the horizon in order to simultaneously carry out an alignment of the line of sight in the same way as with a well-leveled level. Accordingly, it is possible to work with a skewed level in the same way as with a well-leveled level.

In order to obtain correction values in a particularly simple manner and to use these correction values for measurement correction in a corresponding manner, the forward, i.e., object-side, principal point of the objective advantageously lies in the intersection of the sighting axis and vertical axis or at a fixed distance from this intersection.

Further, it is advantageous when the CCD receiver matrix and the objective are displaceable relative to one another by adjusting means in the direction of the optical axis of the objective for focusing the graduated staff image, wherein the CCD receiver matrix or the objective is arranged in a fixed position relative to the vertical axis, and when the displacement path and the displacement direction of the matrix and/or of the objective can be determined from the image data supplied by the receiver elements of the matrix by means of an image evaluating system, known per se.

Further, the display unit is advantageously provided with a screen having a diaphragm for blocking out ambient light and an arrangement is provided which controls the contrast of the screen as a function of the ambient light and which is connected with the computer. In this way, the screen can be properly viewed even under unfavorable light conditions.

A process for video sighting with the level constructed according to the invention, wherein a graduated staff set up at a distant target point is sighted, is characterized in that when the vertical axis of the level is positioned so as to be inclined in space the correction of the sighting axis, with respect to amount and direction, can be determined by the computer from the angle a of the inclination component of the vertical axis in the sighting direction, which angle a is measured in the measuring direction of the biaxial clinometer, and the image erection correction of a cross-line displayed on the screen can be determined by the computer from an angle β of the inclination component of the vertical axis transverse to the sighting direction, which angle β is measured in the other measuring direction of the clinometer.

In order to carry out a corresponding correction of the measurement values, it is advantageous when a correction value of the level comprising two height correction values is recorded, wherein there is determined a first height correction value $\Delta h_1 = f \times \sin \alpha \approx f \times \text{arc } \alpha$ by which the center pixel on the CCD receiver matrix and screen is to be displaced in order to mark the horizontal line of sight at the image of the graduated staff on the screen, and wherein there is determined a second height correction value $\Delta h_2 = s \times \sin \alpha \approx s \times \text{arc } \alpha$ which compensates for the distance of the object-side principal point of the objective to the sighting axis diverging from the horizontal, where f represents the focal length of the objective, s represents the distance of the object-side principal point of the objective from the intersection of the vertical axis and sighting axis, and α represents the angle of inclination of the sighting axis of the objective in relation to the horizontal in the sighting direction and the angle of inclination of the vertical axis relative to the normal axis in the sighting direction, and when the reading of the graduated staff is corrected by the computer based on these two height correction values $\Delta h_1$ and $\Delta h_2$.

In order to be able to work in the same way as with a well-leveled level, the graduated staff image or the image crosshair of the screen are displaced vertically for height correction on the screen. For the purpose of image (target) erection correction, the image of the graduated staff on the screen or the image crosshair of the screen is rotated until a vertical or normal position of the graduated staff image or of the image crosshair is achieved.

The invention will be described more fully hereinafter in an embodiment example.

BRIEF DESCRIPTION OF THE DRAWINGS

In the drawings:

FIG. 1 shows the construction of the level in a simplified view;

FIG. 2 shows a simplified ray diagram; and

FIG. 3 shows a view of the screen.

DESCRIPTION OF THE PREFERRED EMBODIMENTS

The electronic level shown in FIG. 1 comprises a stationary tribrach 1 on which a top part 2 is mounted so as to be rotatable about a vertical axis STA. The tribrach 1 itself can be a leveling device, known per se, with foot screws 3 or with a ball head or wedge disks by which the level can be leveled. The vertical axis STA is shown in the Figures as a dash-dot line. The top part 2 carries all of the elements or component assemblies needed for the operation of the level. Located in the top part 2 are an objective 4 whose optical axis coincides with the sighting axis ZA, a CCD receiver matrix 5 formed of CCD receivers as image receiving device, and a screen 6 with diaphragm 7 for blocking out interfering extraneous light. The combination of objective 4 and CCD receiver matrix 5 represents, in principle, a video camera, wherein the CCD receiver matrix 5 is preferably operated in video clock and accordingly supplies moving images. The objective 4 is arranged in a fixed position relative to the vertical axis STA such that its object-side principal point H coincides with the intersection A of the vertical axis STA and sighting axis ZA. The principal point H can also be arranged at a fixed distance s from this intersection point A as is illustrated, for example, in FIGS. 1 and 2. The distance s is taken into account as a device constant in determining the measurement values, e.g., in the height corrections, as will be further described hereinafter. Further, there are provided in or on the top part 2 a power supply unit 8, an input unit 9, e.g., a keyboard for entering data, a preferably multiaxial clinometer 10, a computer 11 and a corresponding electronics subassembly 12 for image evaluation and for controlling the individual functions, as well as subassemblies and a monitor 13 for focusing the objective 4 on the CCD receiver matrix 5 in order to obtain a sharp image of a graduated staff (not shown) set up at a distance from the level. This monitor 13 can also be provided at the rear of the level. An endless drive control 14 is advantageously provided for fine adjustment of the objective 4 of the level telescope on the graduated staff representing the target. A rough leveling of the device can be carried out by displacing the foot screws 3 in accordance with a bubble level 15 which can be arranged in the upper part of the level.

A biaxial clinometer 10 is provided for measuring inclination and for determining and taking into account the inclined position of the level, wherein inclinations in the direction of the sighting axis ZA and in a direction orthogonal thereto in the horizontal plane are determined and included in further measurements by means of this clinometer 10. However, the two measurement directions of the clinometer 10 can also enclose an angle with one another other than a right angle.

In order to focus the objective 4 on the plane of the CCD receiver matrix 5, these two subassemblies are adjustable relative to one another. For this purpose, as is shown in FIG. 1, a tube 16 carrying the CCD receiver matrix 5 is mounted in a guide 17 and is displaceable in the direction of the sighting axis by a drive 18. Focusing can be carried out automatically by means of an integrated image evaluating system. The latter calculates data from the image of the graduated staff and causes the focusing to be carried out by means of a corresponding signal by adjusting the distance between the objective 4 and the CCD receiver matrix 5 by a drive 18. When the image evaluating system has detected a sharp image, the focusing process is stopped; the graduation of the graduated staff set up at the target can now be read.

The conditions to be met for correction functioning of the level can be seen from the simplified ray diagram of the level shown in FIG. 2. The vertical axis STA and therefore also the objective 4 of the level telescope are shown inclined by angle a to the staff horizon. The ray characterizing the horizon traverses the object-side focal point F of the objective 4 and impinges on the object-side principal plane H of the objective 4. This focal point ray, as it is called, is imaged by the objective 4 parallel to the sighting axis ZA in the image point $L_1$ situated in the plane $M_1$ of the CCD receiver matrix 5. In case of infinite target distance, the focal plane $M_1$ forms the plane in which the image-side focal point F' of the objective 4 is situated. As the graduated staff approaches the level, the distance of the focal plane from the objective 4 increases. The location of the focal plane $M_2$ with focal point $L_2$ for the shortest possible target distance (about 3 m) is shown by way of example in FIG. 2. The CCD receiver matrix 5 is moved and adjusted relative to the objective 4, or vice versa, in a corresponding manner in the interval between $M_1$ and $M_2$ by means of the focusing system.

At the same time, angle a is determined by the clinometer and a first correction value $\Delta h_1$ according to the equation $\Delta h_1 = f \times \sin \alpha \approx f \times \arc \alpha$ is calculated by the computer 11 and the center pixel MP which is located in F' at infinite target distance is displaced by $L_1$, where f represents the focal length of the objective 4. When focusing on different distances to the graduated staff, the distance of focal points $L_1$ and $L_2$ from the sighting axis ZA remains the same.

The reference point for height measurement with the level is the intersection A which lies on the vertical axis STA and sighting axis ZA. Therefore, an additional, second correction value $\Delta h_2 = s \times \sin \alpha \approx s \times \arc \alpha$ which takes into account the distance of the intersection A from the horizon must be determined in reading the graduated staff, so that the total height correction is $\Delta h = \Delta h_1 + \Delta h_2$. The correction value $\Delta h_1$ depends only on the angle of inclination a and on the focal length f of the objective 4 and is determined by the clinometer 10 with respect to amount as well as direction. Accordingly, a positive or a negative sign indicates whether the center pixel MP is to be displaced upward or downward. The focal length f is a fixed device constant which is taken into account as constant value by the computer in the corresponding calculations.

The distance s of the principal point H of the objective 4 from the intersection A is also a device constant which can be entered in a fixed manner and is then automatically taken into account.

However, the situation is different when the objective 10 is displaced for focusing and the CCD receiver matrix is positioned at a fixed distance from the vertical axis STA. In this case, the video camera must not only carry out an autofocusing, but the distance to the graduated staff must also be measured in order to determine the instantaneous focal length for the change of s (distance of objective 10 from the vertical axis STA).

The height correction value $\Delta h_2$ is generally small when the level is well-leveled beforehand and the objective 4 is not arranged too far from the vertical axis STA. The value $\Delta h_2$ is zero when the principal point H of the objective 4 coincides with intersection A.

The position of the center pixel MP in the case of a well-leveled level is shown on the screen of the monitor 13 in FIG. 3. If the level is tilted, the image 19 of the graduated staff on the screen occupies the position shown in dashes which is rotated by a transverse angle of inclination β with respect to the horizontal position of the crosshair 20. This angle β is likewise determined by the clinometer 10. The inclined image 19 is then rotated by angle β into the horizontal position in the computer 11 by means of an image erection correction, so that it conforms to the crosshair 20.

While the foregoing description and drawings represent the preferred embodiments of the present invention, it will be obvious to those skilled in the art that various changes and modifications may be made therein without departing from the true spirit and scope of the present invention.

What is claimed is:

1. An electronic level comprising:

a clinometer;

an image receiving device having a telescope with an objective and with a CCD receiver matrix and with a screen for displaying the image of a graduated staff which is set up at a target and provided with a coded graduation;

a vertical axis about which the level rotates;

a leveling device for alignment and rough leveling of the level with respect to the graduated staff;

an input unit for entering measurement data;

a power supply unit and a computer for processing the measurement data, calculating measurement values and for image evaluation;

said image receiving device comprising said CCD receiver matrix which is operated in video time;

said objective or said CCD receiver matrix being arranged in a fixed position relative to the vertical axis;

said objective and CCD receiver matrix being adjustable relative to one another; and the clinometer being assigned in a fixed manner for measuring the deviation of the position of a sighting axis relative to the horizon;

wherein the sighting axis is formed by a center pixel of the CCD receiver matrix.

2. The level according to claim 1, wherein the measurement axes of the clinometer are perpendicular to one another and one measurement axis is vertical to the sighting axis or at a fixed angle thereto, wherein the clinometer is connected with the computer.

3. The level according to claim 1, wherein the front principal point of the objective lies in the intersection of the sighting axis and vertical axis or at a fixed distance s from this intersection.

4. The level according to claim 1, wherein the CCD receiver matrix and the objective are displaceable relative to one another by adjusting means or a drive in the direction of the optical axis of the objective for focusing the graduated staff image, wherein the CCD receiver matrix or the objective are in a fixed position, and wherein the displacement path and the displacement direction of the matrix and/or of the objective can be determined from the image data supplied by the receiver elements of the matrix by an imaging evaluating system.

5. The level according to claim 1, wherein the display unit is provided with a screen which has a diaphragm for blocking out ambient light, wherein an arrangement is provided which controls the contrast of the screen depending on the ambient light and is connected with the computer.

6. A process for video sighting with a level having:

a clinometer;

an image receiving device having a telescope with an objective and with a CCD receiver matrix and with a screen for displaying the image of a graduated staff which is set up at a target and provided with a coded graduation;

a vertical axis about which the level rotates;

a leveling device for alignment and rough leveling of the level with respect to the graduated staff;

an input unit for entering measurement data;

a power supply unit and a computer for processing the measurement data, calculating measurement values and for image evaluation;

said image receiving device comprising said CCD receiver matrix which is operated in video time;

said objective or said CCD receiver matrix being arranged in a fixed position relative to the vertical axis;

said objective and CCD receiver matrix being adjustable relative to one another; and the clinometer being assigned in a fixed manner for measuring the deviation of the position of a sighting axis relative to the horizon;

wherein the sighting axis is formed by a center pixel of the CCD receiver matrix and wherein a graduated staff arranged at a distant target is sighted, said process comprising the steps of:

when the vertical axis of the level is positioned so as to be inclined in space, determining the correction of the sighting axis, with respect to amount and direction, by the computer from the angle $\alpha$ of the inclination component of the vertical axis in the sighting direction, which angle $\alpha$ is measured in the measuring direction of the biaxial clinometer, and determining the image erection correction of a cross-line or crosshair displayed on the screen or a monitor by the computer from an angle $\beta$ of the inclination component of the vertical axis transverse axis transverse to the sighting direction, which angle $\beta$ is measured in the other measuring direction of the clinometer.

7. The process according to claim 6, wherein a correction value of the level comprising two height correction values is recorded, wherein a first height correction value $\Delta h_1 = f \times \sin \alpha \approx f \times \text{arc } \alpha$ is determined by which the center pixel on the CCD receiver matrix and screen is to be displaced in order to mark the horizontal line of sight at the image of the graduated staff on the screen, and a second height correction value $\Delta h_2 = s \times \sin \alpha \approx s' \text{arc } \alpha$ is determined which compensates for the distance of the object-side principal point of the objective to the sighting axis diverging from the horizontal, where f represents the focal length of the objective, s represents the distance of the object-side principal point of the objective from the intersection of the vertical axis and sighting axis, and $\alpha$ represents the angle of inclination of the sighting axis of the objective in relation to the horizontal in the sighting direction and the angle of inclination of the vertical axis relative to the normal axis in the sighting direction, and in that the reading of the graduated staff is corrected by the computer based on these two height correction values $\Delta h_1$ and $\Delta h_2$.

8. The process according to claim 6, wherein, for purposes of height correction on the screen, the graduated staff image or the image crosshair of the screen is displaced vertically for height correction on the screen, and wherein the image of the graduated staff on the screen or the image crosshair of the screen is rotated until a vertical position of the graduated staff image or of the image crosshair is achieved.

* * * * *